United States Patent
Chen et al.

(10) Patent No.: US 12,032,274 B2
(45) Date of Patent: Jul. 9, 2024

(54) MULTI-DEGREE-OF-FREEDOM ATTITUDE ADJUSTMENT CAMERA APPARATUS, AND CONTROL METHOD, DEVICE AND MEDIUM

(71) Applicant: Shenzhen Technology University, Guangdong (CN)

(72) Inventors: Gengliang Chen, Guangdong (CN); Guanwei Lu, Guangdong (CN); Yegui Liu, Guangdong (CN); Yixing Luo, Guangdong (CN)

(73) Assignee: SHENZHEN TECHNOLOGY UNIVERSITY, Guangdong (CN)

( * ) Notice: Subject to any disclaimer, the term of this patent is extended or adjusted under 35 U.S.C. 154(b) by 142 days.

(21) Appl. No.: 17/909,412

(22) PCT Filed: Jun. 23, 2022

(86) PCT No.: PCT/CN2022/100853
§ 371 (c)(1),
(2) Date: Sep. 5, 2022

(87) PCT Pub. No.: WO2023/216378
PCT Pub. Date: Nov. 16, 2023

(65) Prior Publication Data
US 2023/0367187 A1     Nov. 16, 2023

(30) Foreign Application Priority Data
May 13, 2022 (CN) .......................... 202210519075.5

(51) Int. Cl.
G03B 17/56 (2021.01)
H04N 23/695 (2023.01)

(52) U.S. Cl.
CPC ......... *G03B 17/561* (2013.01); *H04N 23/695* (2023.01)

(58) Field of Classification Search
CPC ............................ G03B 17/561; H04N 23/695
See application file for complete search history.

(56) References Cited

U.S. PATENT DOCUMENTS 4,728,336 A * 3/1988 Cooper .................... A61F 2/60
                                                    623/47
4,912,754 A * 3/1990 Van Steenburg .... A61B 6/0442
                                                    5/601

(Continued)

FOREIGN PATENT DOCUMENTS

CN         210440876 U  *  5/2020

*Primary Examiner* — Chiawei Chen
(74) *Attorney, Agent, or Firm* — Notaro, Michalos & Zaccaria P.C.; John S. Economou

(57) ABSTRACT

Disclosed are a multi-degree-of-freedom attitude adjustment camera apparatus, and a control method, device and medium, the apparatus includes: a fixed support; a camera adjusting module which includes an upper chassis, a lower chassis and three bolts, the upper chassis is fixed on the fixed support, the upper chassis is provided with three through holes with threaded structures, and the three bolts penetrate through the three through holes and are matched with the threaded structures on the through holes; first ends of the bolts penetrate through the through holes and then are connected with a first surface of the lower chassis; and a second surface of the lower chassis is provided with a connecting member for connecting a camera; three motors, wherein the motors are connected to second ends of the bolts; and an upper computer connected with the motors and the camera.

10 Claims, 4 Drawing Sheets

(56) References Cited

U.S. PATENT DOCUMENTS

| | | | | |
|---|---|---|---|---|
| 10,851,936 | B1* | 12/2020 | Bronson | F16M 11/22 |
| 2002/0154278 | A1* | 10/2002 | Masuda | G02B 7/02 |
| | | | | 353/101 |
| 2003/0197960 | A1* | 10/2003 | Harada | G02B 7/026 |
| | | | | 359/814 |
| 2006/0012900 | A1* | 1/2006 | Chang | G03B 17/561 |
| | | | | 359/876 |
| 2013/0162894 | A1* | 6/2013 | Lee | H04N 23/00 |
| | | | | 348/373 |
| 2016/0269647 | A1* | 9/2016 | Kim | H04N 7/183 |
| 2019/0173986 | A1* | 6/2019 | Xu | H04M 1/0264 |
| 2020/0401021 | A1* | 12/2020 | Dong | H04M 1/0264 |
| 2021/0272432 | A1* | 9/2021 | Omata | G08B 13/19619 |
| 2022/0026661 | A1* | 1/2022 | Fukushima | H04N 5/74 |
| 2023/0184371 | A1* | 6/2023 | Grey | F16M 11/34 |
| | | | | 248/188.5 |

* cited by examiner

MULTI-DEGREE-OF-FREEDOM ATTITUDE ADJUSTMENT CAMERA APPARATUS, AND CONTROL METHOD, DEVICE AND MEDIUM

CROSS-REFERENCE TO RELATED APPLICATIONS

This application is a national stage filing under 35 U.S.C. § 371 of international application number PCT/CN2022/100853, filed Jun. 23, 2022, which claims priority to Chinese patent application No. 202210519075.5 filed May 13, 2022. The contents of these applications are incorporated herein by reference in their entirety.

TECHNICAL FIELD

The present disclosure relates to the field of optical detection, and more particularly, to a multi-degree-of-freedom attitude adjustment camera apparatus, and a control method, device and medium.

BACKGROUND

In the automatic optical detection industry, optical images are widely applied in intelligent defect detection of manufacturing industry. A machine shoots a target image through a camera, defects of a member to be measured are detected after image identification and processing, and the defects are showed through a display or automatic marking, so as to improve a yield of products. In the traditional automatic optical detection industry, a special light source is irradiated on a surface of an object, then the surface of the object is imaged through an industrial camera, and then defect detection, identification and classification of the surface of the object are realized through a computer vision program. Therefore, the automatic detection of the object to be measured is realized. The detection process is changed from manual detection to non-contact detection, thus being efficient, automatic and intelligent.

According to an imaging principle of an optical lens, an ideal imaging mode is that a sensor array of the camera is completely parallel to the surface of the object to be measured, or for a curved surface, the camera is perpendicular to a normal direction of a surface to be measured. However, existing camera structures are mostly fixed structures, or can only focus automatically in a vertical direction. For the precision measurement of a convex surface, a mirror surface structure and a wafer, one-way adjustment greatly reduces the imaging quality of the object to be measured, so that imaging and defect identification algorithms of the object to be measured are greatly increased.

Especially for the surface defect detection of an object with a smooth curved surface, an angle between the camera and the surface is more directly related to the imaging quality due to specular reflection. At present, it is difficult to realize automatic detection, so that the smooth curved surface is mostly detected manually.

In addition to general curved products (such as a curved screen of mobile phone, and reflective curved glass), when performing high-precision optical measurement on the wafer and other targets, a field measurement target is generally in an order of 10 microns to 1 mm. It belongs to typical local target optical magnification imaging, while an imaging lens and a CCD sensor are both much larger than target sizes. At present, there is still a lack of an apparatus for adjusting the camera and the target to be measured to the most appropriate positions.

SUMMARY

In order to solve at least one of the technical problems in the prior art to some extent, the present disclosure aims to provide a multi-degree-of-freedom attitude adjustment camera apparatus, and a control method, device and medium.

The technical schemes used in the present disclosure are as follows.

A multi-degree-of-freedom attitude adjustment camera apparatus includes: a fixed support; a camera adjusting module which includes an upper chassis, a lower chassis and three bolts, the upper chassis is fixed on the fixed support, the upper chassis is provided with three through holes with threaded structures, and the three bolts penetrate through the three through holes and are matched with the threaded structures on the through holes; first ends of the bolts penetrate through the through holes and then are connected with a first surface of the lower chassis; a second surface of the lower chassis is provided with a connecting member for connecting a camera; and positions of the three through holes are on three vertices of a same equilateral triangle; three motors, the motors are connected to second ends of the bolts; and an upper computer connected with the motors and the camera for controlling operating states of the motors according to image information collected by the camera, so as to control lengths of the bolts penetrating through the through holes.

Further, the multi-degree-of-freedom attitude adjustment camera apparatus further includes a plurality of springs, the springs are arranged between the upper chassis and the lower chassis, and the springs are in a stretched state.

Further, three springs are provided, and a position of each spring is arranged between two bolts.

Further, the first surface of the lower chassis is provided with three notches, positions of the notches are matched with the bolts, and the first ends of the bolts are arranged in the notches.

Further, the multi-degree-of-freedom attitude adjustment camera apparatus further includes a light source; the light source is arranged on the second surface of the lower chassis; or, the light source is arranged on the camera.

Further, straight lines on which the three bolts are located are parallel to each other, and a distance between every two bolts is equal.

Another technical scheme used in the present disclosure is: a control method for controlling the multi-degree-of-freedom attitude adjustment camera apparatus above, which includes: acquiring first image information of an object to be measured, and determining whether the camera achieves focusing or not according to the first image information; if the focusing is not achieved, controlling the three motors to operate at the same time, so that displacements of the three bolts penetrating through the through holes are equal, until the focusing of the camera is achieved; a plane on which the lower chassis is located is parallel to a measurement surface of the object to be measured.

Further, after achieving the focusing of the camera, the control method further includes: acquiring second image information, and determining whether a low-quality area exists in an image according to the second image information; and if the low-quality area exists, indicating that an angle is formed between a CCD array in the camera and the measurement surface of the object to be measured, and controlling the motors to operate, so that a deflection angle is formed between the lower chassis and the measurement surface of the object to be measured, until a picture of the low-quality area becomes clear.

Another technical scheme used in the present disclosure is: a control device, which includes: at least one processor; and at least one memory for storing at least one program; when the at least one program is executed by the at least one processor, causes the at least one processor to perform the method above.

Another technical scheme used in the present disclosure is: a non-transitory computer readable storage medium storing a program executable by a processor, which, when executed by the processor, causes the processor to perform the method above.

The present disclosure has the beneficial effects that: according to the present disclosure, the position of the camera is adjusted according to the feedback image information to improve the quality of image collection; and in addition, the apparatus is simple in structure and easy to realize.

BRIEF DESCRIPTION OF THE DRAWINGS

In order to illustrate the technical schemes in the embodiments of the present disclosure or in the existing technology more clearly, the drawings of the related technical schemes in the embodiments of the present disclosure or in the prior art are described below. It should be understood that, the drawings in the following description are merely intended to facilitate clear presentation of some embodiments in the technical schemes of the present disclosure. For those skilled in the art, other drawings may also be obtained based on these drawings without going through creative operates.

Figure 1:
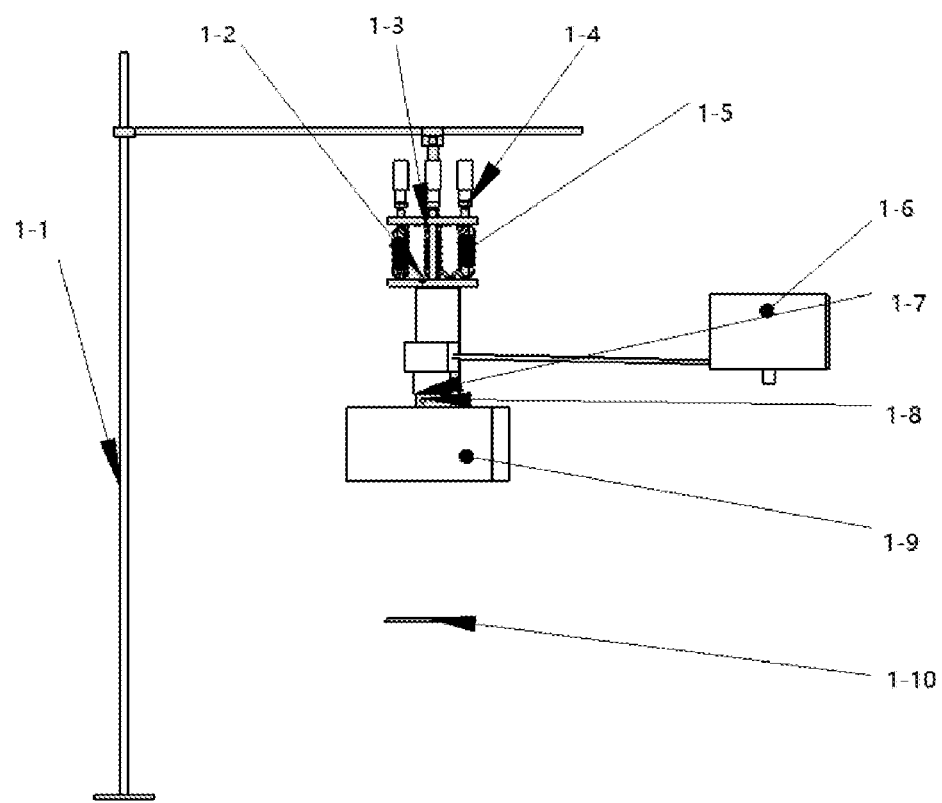
FIG. 1 is a schematic structural diagram of a multi-degree-of-freedom attitude adjustment camera apparatus in the embodiments of the present disclosure.
Figure 2:
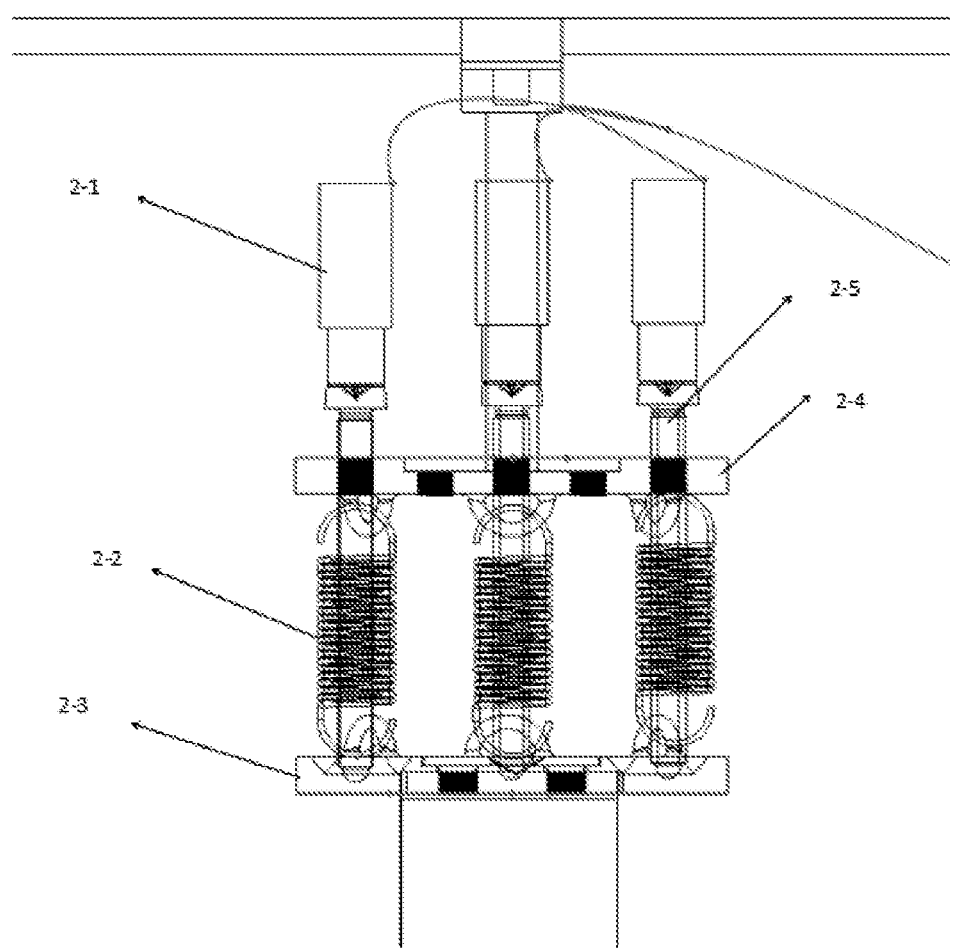
FIG. 2 is a local schematic diagram of the multi-degree-of-freedom attitude adjustment camera apparatus in the embodiments of the present disclosure.

REFERENCE NUMERALS in FIG. 1, 1-1 refers to fixed support; 1-2 refers to lower chassis; 1-3 refers to upper chassis; 1-4 refers to motor; 1-5 refers to bolt; 1-6 refers to upper computer; 1-7 refers to connecting member; 1-8 refers to camera; 1-9 refers to light source; and 1-10 refers to object to be measured; and in FIG. 2, 2-1 refers to motor; 2-2 refers to spring; 2-3 refers to lower chassis; 2-4 refers to upper chassis; and 2-5 refers to bolt.

DETAILED DESCRIPTION

Embodiments of the present disclosure are described below in detail, illustrations of which are shown in the accompanying drawings, where identical or similar reference numerals denote identical or similar elements or elements having the same or similar functions. The embodiments described below by reference to the accompanying drawings are exemplary and are intended only to explain the present disclosure and are not to be construed as limiting the present disclosure. The numbers of the steps in the following embodiments are only set for convenience of explanation, and the sequence of the steps is not restricted. The execution sequence of the steps in the embodiments may be adjusted adaptively according to the understanding of those skilled in the art.

In the description of the present disclosure, it should be understood that any orientation/position related description, such as the orientational or positional relationship, such as, up, down, front, rear, left, right, and the like, is based on the orientational or positional relationship shown in the accompanying drawings, is only for the purpose of facilitating the description of the present disclosure and simplifying the description, and does not indicate or imply that the device or element must have a specific orientation or position, be constructed and operated in a specific orientation or position, and therefore shall not be understood as a limitation to the present disclosure.

In the description of the present disclosure, several means one or more, a plurality of means more than two, greater than, less than, more than, and the like are understood as not including this number, while above, below, within, and the like are understood as including this number. If there are the descriptions of first and second, it is only for the purpose of distinguishing technical features, and should not be understood as indicating or implying relative importance, implicitly indicating the number of the indicated technical features or implicitly indicating the order of the indicated technical features.

In the description of the present disclosure, words such as setup, installation, and connection shall be understood in a broad sense unless otherwise expressly limited, and a person skilled in the art may reasonably determine the specific meaning of the above words in the present disclosure with reference to the context of the technical scheme.

An existing device has the following problem when measuring a smooth reflective plane and a smooth transmitting plane: in smooth surface defect detection based on optical imaging, an angle between a camera and a sample surface is directly related to an imaging area and a dynamic range of a signal in a measurement area. Moreover, microscopic measurement has the following problem: a system of a general microscopic imaging camera only supports adjustment of a focusing surface (in a Z direction of height). However, an actual measurement target has a relatively small size, so that it is impossible to ensure that a surface of a target to be measured is completely parallel to a CCD array of the camera. Therefore, due to a limitation of a depth of field of a lens, a whole picture may be partially clear and partially blurred. Meanwhile, due to an incomplete vertical state, a measurement precision of the microscopic camera is also restricted. No matter if an optical microscopic image is used for defect detection or size measurement, the whole image cannot be focused, resulting in a large data error in imaging and measurement. Generally speaking, an existing camera fixing apparatus (or one-way adjustment device) can only realize automatic focusing of the image. In measurement of a reflective surface, it is impossible to automatically adjust position and orientation of the camera according to an image. In precision optical measurement, it is impossible to make CCD completely parallel to a tiny surface to be measured, thus reducing an optical measurement precision. In order to solve the problems above, the present application provides a multi-degree-of-freedom attitude adjustment camera apparatus.

As shown in FIG. 1 and FIG. 2, the embodiment provides a multi-degree-of-freedom attitude adjustment camera apparatus, which includes:

a fixed support;

a camera adjusting module which includes an upper chassis, a lower chassis and three bolts, wherein the upper chassis is fixed on the fixed support, the upper chassis is provided with three through holes with threaded structures, and the three bolts penetrate through the three through holes and are matched with the threaded structures on the through holes; first ends of the bolts penetrate through the through holes and then are connected with a first surface of the lower chassis; and a second surface of the lower chassis is provided with a connecting member for connecting a camera;

three motors, wherein the motors are connected to second ends of the bolts; and an upper computer connected with the motors and the camera for controlling operating states of the motors according to image information collected by the camera, so as to control lengths of the bolts penetrating through the through holes.

As an optional implementation, the multi-degree-of-freedom attitude adjustment camera apparatus further includes three springs, the springs are arranged between the upper chassis and the lower chassis, and the springs are in a stretched state.

As an optional implementation, the first surface of the lower chassis is provided with three notches, positions of the notches are matched with the bolts, and the first ends of the bolts are arranged in the notches.

As an optional implementation, the multi-degree-of-freedom attitude adjustment camera apparatus further includes a light source;

the light source is arranged on the second surface of the lower chassis; or, the light source is arranged on the camera.

In the apparatus above, the image is used as a feedback, and position and orientation of the camera are automatically adjusted by using the motor. A operating principle of the apparatus is as follows: the upper chassis is fixed on the support, the lower chassis is used for fixing the camera and the light source, the upper chassis and the lower chassis are connected through three springs with large elastic coefficients, the three springs are all kept in the stretched state, the bolts are in precise screw fit with the upper chassis, the lower chassis is in point contact with the bolts, and the notches of the lower chassis ensure that the bolts and the lower chassis may not slide relatively. In the apparatus, a state of the lower chassis is determined by three bolts, and the three bolts do not affect each other in operating.

The focus of the camera is adjusted by the following mode of: adjusting the three bolts (A, B, C) to a same height L, and at the moment, adjusting the bolts A, B, C synchronously to realize automatic focusing of the camera. When a focus distance needs to be increased, a distance between the upper chassis and the lower chassis is reduced by adjusting the bolts, so as to achieve the purpose of increasing the focus distance. Similarly, when the focus distance needs to be reduced, the distance between the upper chassis and the lower chassis is increased by adjusting the bolts.

After focusing, if a computer (which is namely the upper computer) detects a defective area in image quality (which is namely the low-quality area), such as a light supersaturation area and a light unbalance area, the computer sends a control signal and starts the motor, and the motors drive the bolts to rotate, which causes a change of a plane of the lower chassis, thus achieving the purpose of adjusting the position and orientation of the camera. Due to very precise fit of the bolts, the apparatus can finely adjust an angle between a plane of the camera and a surface of the object to be measured, so that the surface of the object to be measured can be perfectly collected by the camera.

The control scheme above is explained in detail below with reference to the drawings.

Figure 3:
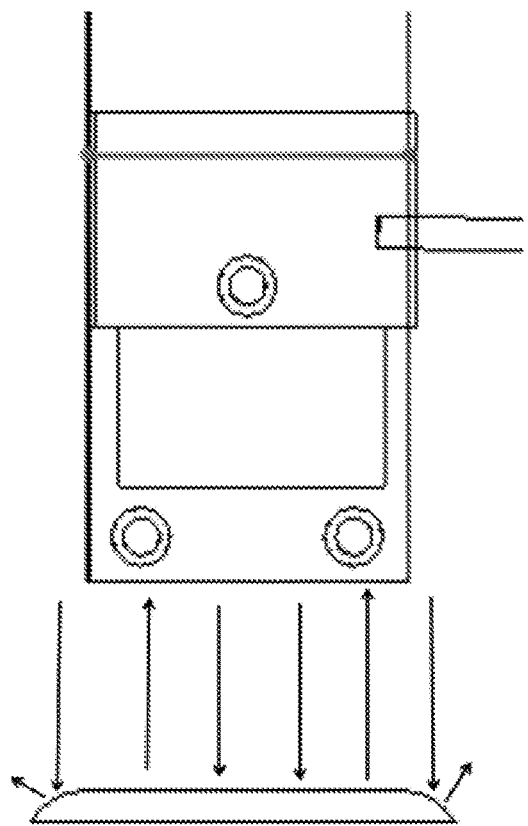
FIG. 3 is a schematic diagram of reflected and incident light rays on a plane and a curved surface in the embodiments of the present disclosure.

Referring to FIG. 3, lines with downward arrows are incident light rays, and lines with upward arrows are reflected light rays. It can be obviously seen from FIG. 3 that, imaging on a curved surface on an edge may be failed due to reflection of light rays.

The existing apparatus is difficult to detect this kind of object, because the camera and the light source are fixed just above a plane area of the object to be measured, and there is a lack of apparatus to automatically adjust angles between the camera and the plane and between the light source and the plane according to the feedback of the image. Therefore, incomplete imaging of a curved surface of the object to be measured is caused due to light reflection. In this way, the curved surface on the edge may form a blind area of area imaging, and subsequent processing may also become difficult.

Figure 4:
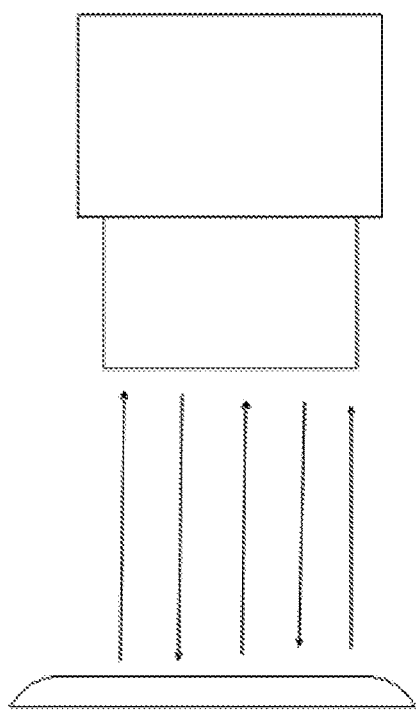
FIG. 4 is a schematic diagram of position and orientation when collecting image information of the plane through a camera in the embodiments of the present disclosure.

Referring to FIG. 4, when the object to be measured is the plane, the apparatus of the embodiment may ensure that the camera is completely parallel to the plane of the object to be measured, thus ensuring perfect imaging of the surface of the object.

Figure 5:
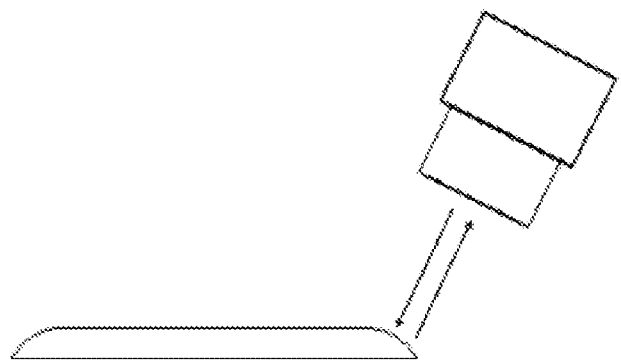
FIG. 5 is a schematic diagram of position and orientation when collecting image information of the curved surface through the camera in the embodiments of the present disclosure.

Referring to FIG. 5, when the object to be measured is the curved surface, the apparatus may automatically adjust the camera to be perpendicular to a normal of the curved surface of the object to be measured according to imaging quality, thus ensuring the imaging quality.

Figure 6:
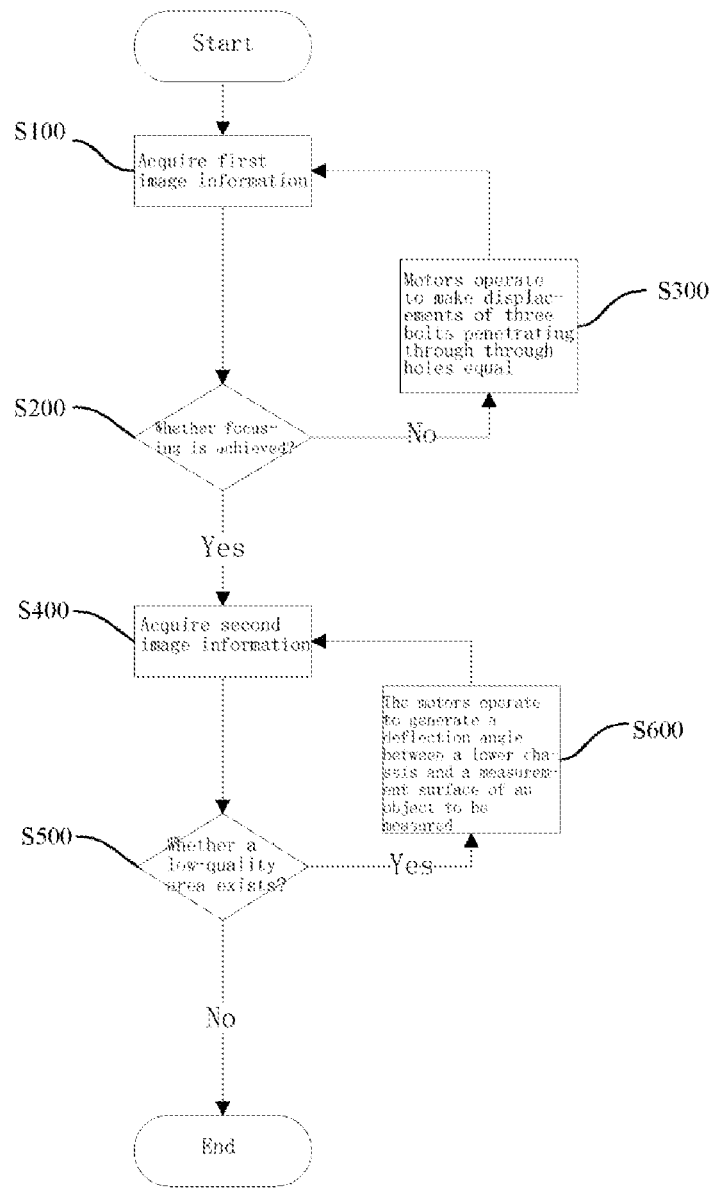
FIG. 6 is a operate flow chart of the multi-degree-of-freedom attitude adjustment camera apparatus in the embodiments of the present disclosure.

Referring to FIG. 6, a whole operate flow is as follows: the camera collects the image information, and the computer determines the image quality according to the image information, if the image quality is low, the computer controls the motors to operate, adjusts the lengths of the bolts, changes the angle of the lower chassis, and then adjusts the position and orientation of the camera until the camera can collect a good-quality image.

In conclusion, compared with the corresponding art, the apparatus of the embodiment has the following advantages and beneficial effects.

(1) In traditional automatic focusing, the camera is only adjusted in a Z direction (vertical direction), so that a certain angle is formed between the CCD array and the imaging target in practical application. Therefore, a same image may be partially clear and partially blurred. In the embodiment, multi-degree-of-freedom attitude adjustment of the camera is realized, and a plane and a CCD array of a same imaging target are adjusted to be in a balanced state by adjusting the attitude of the camera, thus realizing clear imaging of the whole imaging target.

(2) For detection and measurement of a precision plane, such as wafer detection, the camera is completely parallel to a measurement surface by automatically adjusting the attitude of the camera, and an imaging surface of the target is just in the CCD array, thus improving a measurement precision.

(3) For detection of a smooth reflective surface, especially a smooth curved surface, the apparatus may realize that the angle between the camera and the light source may be any value by adjusting the attitude of the multi-degree-of-freedom camera, thus solving the problem of curved surface imaging.

The embodiment further provides a control method for controlling the apparatus shown in FIG. 1, which includes:

acquiring first image information of an object to be measured, and determining whether the camera achieves focusing or not according to the first image information;

if the focusing is not achieved, controlling the three motors to operate at the same time, so that displacements of the three bolts penetrating through the through holes are equal, until the focusing of the camera is achieved;

wherein, a plane on which the lower chassis is located is parallel to a measurement surface of the object to be measured.

Further, as an optional implementation, after achieving the focusing of the camera, the control method further includes:

acquiring second image information, and determining whether a low-quality area exists in an image according to the second image information; and if the low-quality area exists, indicating that an angle is formed between a CCD array in the camera and the measurement surface of the object to be measured, and controlling the motors to operate, so that a deflection angle is formed between the lower chassis and the measurement surface of the object to be measured, until a picture of the low-quality area becomes clear.

The control method of the embodiment has a corresponding relationship with the multi-degree-of-freedom attitude adjustment camera apparatus above, thus having corresponding functions and beneficial effects of the apparatus.

The embodiment further provides a control device, which includes:

at least one processor; and at least one memory for storing at least one program;

when the at least one program is executed by the at least one processor, causes the at least one processor to perform the method above.

The control device of the embodiment can execute the control method provided by the method embodiment of the present disclosure, can execute any combined implementation step of the method embodiment, and has corresponding functions and beneficial effects of the method.

The embodiment further provides a storage medium, which stores an instruction or program capable of executing the control method provided by the method embodiment of the present disclosure, and when the instruction or program is run, can execute any combined implementation step of the method embodiment, and has corresponding functions and beneficial effects of the method.

In some optional embodiments, the functions/operations mentioned in the block diagram may occur without following the sequence mentioned in the operation diagram. For example, depending on the functions/operations involved, two blocks shown in consecutively may actually be executed substantially simultaneously or the blocks may sometimes be executed in the reverse sequence. In addition, the embodiments presented and described in the flow chart of the present disclosure are provided by way of example, with the purpose of providing more comprehensive understanding of the technology. The disclosed method is not limited to the operation and logic flow presented herein. The optional embodiments are expected, wherein a sequence of various operations is changed and a sub-operation described as a part of a large-scale operation is independently executed.

In addition, although the present disclosure is described in the context of functional module, it should be understood that, unless otherwise stated, one or more of the functions and/or features may be integrated in a single physical apparatus and/or software module, or one or more functions and/or features may be implemented in separate physical apparatus or software modules. It can also be understood that, a detailed discussion about the actual implementation of each module is not necessary for understanding the present disclosure. More specifically, considering the attributes, functions and internal relations of various functional modules in the apparatus disclosed herein, the actual implementation of the module will be known within conventional technologies of an engineer. Therefore, those skilled in the art can implement the present disclosure explained in the claims without undue experimentation by applying common technologies. It can also be understood that, the specific concepts disclosed are only illustrative and not intended to limit the scope of the present disclosure, and the scope of the present disclosure is determined by the appended claims and the full scope of equivalent solutions of the claims.

The functions may also be stored in a computer-readable storage medium if being implemented in the form of a software function unit and sold or used as an independent product. Based on such understanding, the essence of the technical schemes of the present disclosure, or the part contributing to the prior art or a part of the technical schemes, may be embodied in the form of a software product. The computer software product is stored in a storage medium including a number of instructions such that a computer device (which may be a personal computer, a server, or a network device, etc.) executes all or a part of steps of the method described in each of the embodiments of the present disclosure. The foregoing storage medium comprises: any medium that is capable of storing program codes such as a USB disk, a mobile hard disk, a Read-Only Memory (ROM), a Random Access Memory (RAM), a magnetic disk or an optical disk, and the like.

The logic and/or step shown in the flow chart or described in other ways herein, such as the sequence list of executable instructions regarded as being used for implementing logic functions, can be specifically implemented in any computer-readable medium for use by or in combination with instruction execution system, apparatus or device (such as a computer-based system, a system including a processor or other systems that can receive and execute the instructions from the instruction execution system, apparatus or device). For this specification, the "computer-readable medium" can be any apparatus that may contain, store, communicate, propagate, or transport a program for use in an instruction execution system, apparatus, or device, or may be used in conjunction with such an instruction execution system, apparatus, or device.

More specific examples (non-exhaustive list) of the computer-readable media include the following: electric connecting portions (electronic devices) having one or more wires, portable computer disk cartridges (magnetic devices), random access memory (RAM), read-only memory (ROM), erasable editable read only memory (EPROM or flash memory), fiber optic devices, and portable compact disk read only memory (CDROM). In addition, the computer-readable medium may even be a piece of paper or other suitable medium on which the program can be printed, as it may be optically scanned, for example by paper or other medium, followed by editing, interpretation or other suitable method if appropriate to proceed, so as to obtain the program electronically and then store the program in the computer memory.

It should be understood that, portions of the present disclosure may be implemented in hardware, software, firmware or a combination thereof. In the foregoing implementations, multiple steps or methods may be implemented in software or firmware stored in the memory and executed by a suitable instruction execution system. For example, if the steps or methods are implemented in hardware, as in another implementation, it can be implemented by any one or combination of the following techniques well known in the art: a discrete logic circuit with a logic gate for implementing logic functions on data signals, an application specific integrated circuit with a suitable combinational logic gate, a programmable gate array (PGA), a field programmable gate array (FPGA), etc.

In the descriptions above in the specification, the descriptions of the reference terms "one implementation/embodiment", "another implementation/embodiment" or "some implementations/embodiments" refer to that the specific features, structures, materials, or characteristics described in combination with the implementation or example are included in at least one implementation or example of the present disclosure. In the specification, the schematic expressions of the above terms do not necessarily refer to the same implementation or example. Furthermore, the specific features, structures, materials, or characteristics described may be combined in any one or more implementations or examples in a suitable manner.

Although the implementations of the present disclosure have been shown and described, those of ordinary skills in the art may understand that various changes, modifications, substitutions and variations may be made to these implementations without departing from the principle and purpose of the present disclosure, and the scope of the present disclosure is defined by the claims and their equivalents.

The foregoing describes the preferred embodiments of the present disclosure in detail, but the present disclosure is not limited to the embodiments above. Those skilled in the art may further make various equivalent modifications or substitutions without violating the spirit of the present disclosure, and these equivalent modifications or substitutions are all included in the scope defined by the claims of the present application.

What is claimed is:

1. A multi-degree-of-freedom attitude adjustment camera apparatus, comprising:
   a fixed support;
   a camera adjusting module comprising an upper chassis, a lower chassis and three bolts, wherein the upper chassis is fixed on the fixed support, the upper chassis is provided with three through holes with threaded structures, and the three bolts penetrate through the three through holes and are matched with the threaded structures on the through holes; first ends of the bolts penetrate through the through holes and then are connected with a first surface of the lower chassis; and a second surface of the lower chassis is provided with a connecting member for connecting a camera;
   three motors, wherein the motors are connected to second ends of the bolts; and
   an upper computer connected with the motors and the camera for controlling operating states of the motors according to image information collected by the camera, so as to control lengths of the bolts penetrating through the through holes.

2. The multi-degree-of-freedom attitude adjustment camera apparatus of claim 1, wherein the multi-degree-of-freedom attitude adjustment camera apparatus further comprises a plurality of springs, the springs are arranged between the upper chassis and the lower chassis, and the springs are in a stretched state.

3. The multi-degree-of-freedom attitude adjustment camera apparatus of claim 2, wherein three springs are provided, and each spring is arranged between two bolts.

4. The multi-degree-of-freedom attitude adjustment camera apparatus of claim 1, wherein three notches are provided at the first surface of the lower chassis, positions of the notches are matched with that of the bolts, and the first ends of the bolts are arranged in the notches.

5. The multi-degree-of-freedom attitude adjustment camera apparatus of claim 1, wherein the multi-degree-of-freedom attitude adjustment camera apparatus further comprises a light source;
   the light source is arranged on the second surface of the lower chassis; or,
   the light source is arranged on the camera.

6. The multi-degree-of-freedom attitude adjustment camera apparatus of claim 1, wherein straight lines on which the three bolts are located are parallel to each other, and a distance between every two bolts is equal.

7. A control method for controlling the multi-degree-of-freedom attitude adjustment camera apparatus of claim 1, comprising:
   acquiring first image information of an object to be measured, and determining whether the camera achieves focusing or not according to the first image information;
   in response to the focusing being not achieved, controlling the three motors to operate at the same time, so that displacements of the three bolts penetrating through the through holes are equal, until the focusing of the camera is achieved;
   wherein, a plane on which the lower chassis is located is parallel to a measurement surface of the object to be measured.

8. The control method of claim 7, after achieving the focusing of the camera, further comprising:
   acquiring second image information, and determining whether a low-quality area exists in an image according to the second image information; and
   in response to the low-quality area existing, indicating that an angle is formed between a CCD array in the camera and the measurement surface of the object to be measured, and controlling the motors to operate, so that a deflection angle is formed between the lower chassis and the measurement surface of the object to be measured, until a picture of the low-quality area becomes clear.

9. A control device, comprising:
   at least one processor; and
   at least one memory for storing at least one program;
   when the at least one program is executed by the at least one processor, causes the at least one processor to perform the method of claim 7.

10. A non-transitory computer readable storage medium storing a program executable by a processor, which, when executed by the processor, causes the processor to perform the method of claim 7.

* * * * *